US012358352B2

(12) United States Patent
Brennan et al.

(10) Patent No.: US 12,358,352 B2
(45) Date of Patent: Jul. 15, 2025

(54) CONNECTION METHODS FOR POWER REMOVABLE AND/OR MOVABLE DIMMABLE DEVICE

(71) Applicant: Gentex Corporation, Zeeland, MI (US)

(72) Inventors: Drew D. Brennan, Holland, MI (US); Danny L. Minikey, Jr., Fenwick, MI (US); John B. Ostreko, Hudsonville, MI (US); Andrew J. LeVesque, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 562 days.

(21) Appl. No.: 17/674,950

(22) Filed: Feb. 18, 2022

(65) Prior Publication Data

US 2022/0266662 A1    Aug. 25, 2022

Related U.S. Application Data

(60) Provisional application No. 63/151,234, filed on Feb. 19, 2021.

(51) Int. Cl.
| *B60J 7/11* | (2006.01) |
| *B60J 3/04* | (2006.01) |
| *B60R 16/03* | (2006.01) |
| *B60R 16/02* | (2006.01) |
| *G02F 1/153* | (2006.01) |

(52) U.S. Cl.
CPC . *B60J 7/11* (2013.01); *B60J 3/04* (2013.01); *B60R 16/03* (2013.01); *B60R 16/0207* (2013.01); *G02F 1/1533* (2013.01); *G02F 2203/48* (2013.01)

(58) Field of Classification Search
CPC .... B60J 7/11; B60J 7/1853; B60J 3/04; B60R 16/03
USPC ................................................ 296/211, 218
See application file for complete search history.

(56) References Cited

U.S. PATENT DOCUMENTS 4,121,870 A * 10/1978 Oakey ...................... B60J 7/11
                                                                296/218
4,679,847 A *  7/1987 Dirck ...................... B60J 7/106
                                                                296/218

(Continued)

FOREIGN PATENT DOCUMENTS

| DE | 102009033054 A1 * | 2/2010 | ................ B60J 3/04 |
| JP | S63150927 U | 10/1988 | |
| JP | H01282022 A | 11/1989 | |

*Primary Examiner* — Jason S Morrow
(74) *Attorney, Agent, or Firm* — Price Heneveld LLP; Brian James Brewer (57) ABSTRACT

A window apparatus of a vehicle includes a removable panel that selectively encloses an exterior opening of the vehicle. A window having an electro-optic element is connected to the removable panel. A connection interface is configured to selectively connect the removable panel to the vehicle. The connection interface includes a first connection module configured for connection to the header of the vehicle and a second connection module in connection with an interface surface of the removable panel. The alignment of the first and second connection modules electrically connects an electrical supply of the vehicle to the at least one terminal based on an alignment between the connection modules in an assembled configuration.

17 Claims, 12 Drawing Sheets

(56) References Cited

U.S. PATENT DOCUMENTS

| | | | | |
|---|---|---|---|---|
| 4,729,596 | A | * | 3/1988 | Fujihara .................. B60J 7/106 |
| | | | | 296/213 |
| 4,792,166 | A | * | 12/1988 | Shiraishi .................. B60J 7/194 |
| | | | | 292/DIG. 60 |
| 5,805,330 | A | | 9/1998 | Byker et al. |
| 5,940,201 | A | | 8/1999 | Ash et al. |
| 6,039,390 | A | * | 3/2000 | Agrawal ........... G02F 1/133308 |
| | | | | 296/211 |
| 6,039,391 | A | * | 3/2000 | Takahashi .................. B60J 7/11 |
| | | | | 296/218 |
| 6,137,620 | A | | 10/2000 | Guarr et al. |
| 6,239,898 | B1 | | 5/2001 | Byker et al. |
| 6,407,847 | B1 | | 6/2002 | Poll et al. |
| 6,433,914 | B1 | | 8/2002 | Lomprey et al. |
| 6,567,708 | B1 | | 5/2003 | Bechtel et al. |
| 6,597,489 | B1 | | 7/2003 | Guarr et al. |
| 6,988,767 | B2 | * | 1/2006 | Schlachter ................. B60J 7/11 |
| | | | | 296/220.01 |
| 7,085,609 | B2 | | 8/2006 | Bechtel et al. |
| 7,372,611 | B2 | | 5/2008 | Tonar et al. |
| 8,547,624 | B2 | | 10/2013 | Ash et al. |
| 8,643,933 | B2 | * | 2/2014 | Brown ............... H01R 13/6205 |
| | | | | 359/275 |
| 9,908,392 | B1 | | 3/2018 | Nania |
| 9,964,828 | B2 | | 5/2018 | Theiste et al. |

\* cited by examiner

FIG. 12

CONNECTION METHODS FOR POWER REMOVABLE AND/OR MOVABLE DIMMABLE DEVICE

CROSS-REFERENCE TO RELATED APPLICATIONS

This application claims priority under 35 U.S.C. § 119(e) and the benefit of U.S. Provisional Application No. 63/151,234 entitled CONNECTION METHODS FOR POWER REMOVABLE AND/OR MOVABLE DIMMABLE DEVICE, filed on Feb. 19, 2021, by Brennan et al., the entire disclosure of which is incorporated herein by reference.

TECHNOLOGICAL FIELD

The present disclosure relates generally to an electrical connection interface for a vehicle and, more particularly, relates to a connection interface for selectively coupling a removable panel comprising an electro-optic device.

SUMMARY OF THE INVENTION

In one aspect of the disclosure, a window apparatus of a vehicle includes a removable panel that selectively encloses an exterior opening of the vehicle and a window comprising an electro-optic element in connection with the removable panel. The electro-optic element includes at least one electrical terminal. A connection interface is configured to selectively connect the removable panel to the vehicle. The connection interface includes a first connection module configured for connection to the header of the vehicle and a second connection module in connection with an interface surface of the removable panel. An alignment of the first and second connection modules electrically connects an electrical supply of the vehicle to the at least one terminal based on an alignment between the connection modules in an assembled configuration of the window panel in connection with the vehicle.

In another aspect of the disclosure, a window apparatus of a vehicle is disclosed that includes a removable panel. The removable panel includes an electro-optic window element comprising at least one conductive terminal and selectively encloses an exterior opening of the vehicle and a window. A connection interface is configured to selectively connect the removable panel to the vehicle. The connection interface includes a mating pair of connection modules extending from the header of the vehicle to an interface surface of the removable panel and is disposed in a cavity between the header and the interface surface. The connection modules of the connection interface are aligned and electrically connected in response to an assembled configuration of the window panel in connection with the vehicle.

In yet another aspect of the disclosure, a removable window apparatus that selectively encloses an exterior opening of a vehicle is disclosed. The removable window apparatus includes an electro-optic element comprising at least one electrical terminal. The electro-optic element controls a transmittance of the window apparatus. A connection interface selectively locks the removable window panel to the vehicle in an assembled configuration. The connection interface comprising at least one locating pin forming a protrusion extending from the connection interface. The locating pin includes one or more conductive pads extending along an exterior surface of the protrusion. A receiving aperture forms an interior wall. A plurality of conductive contacts are disposed on the interior wall and conductively engage the conductive pads in the assembled configuration.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which.

DETAILED DESCRIPTION OF EMBODIMENTS

Figure 1A:
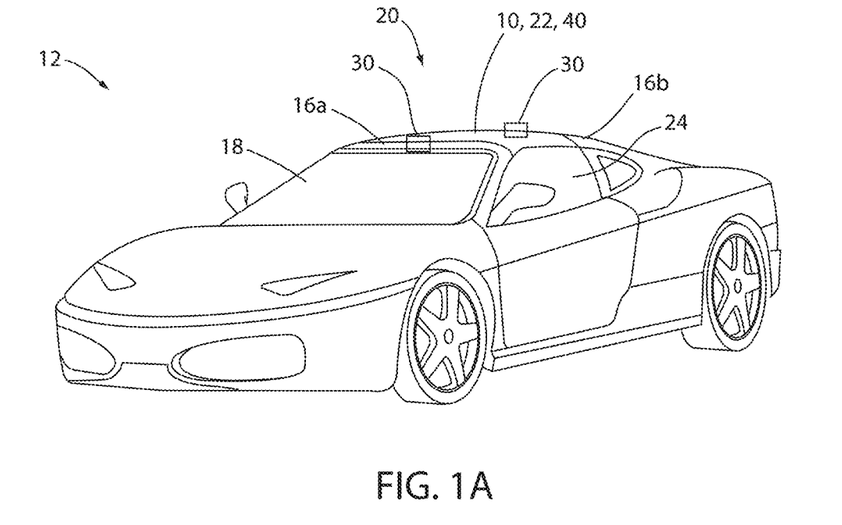
FIG. 1A is a projected view of a vehicle comprising a detachable roof panel demonstrated in a connected configuration.
Figure 1B:
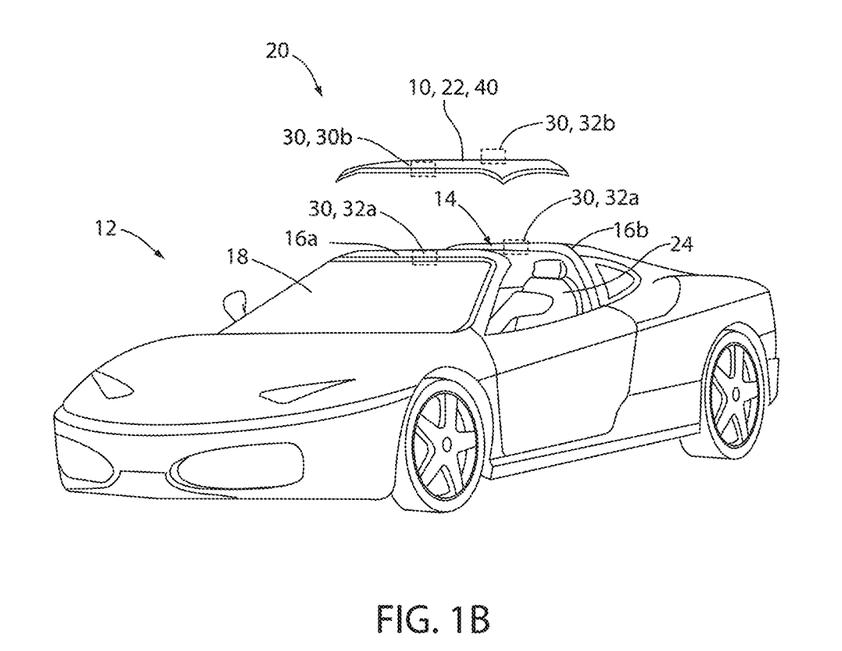
FIG. 1B is a projected view of a vehicle comprising a detachable roof panel demonstrated in a removed configuration.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1A, 1B, 2, and 3 a removable body panel or roof panel 10 is shown in an installed configuration (FIG. 1A) and a removed configuration (FIGS. 1B and 2) in relation to a vehicle 12. As depicted in the exemplary illustrations, the roof panel 10 embodies a removable top designed to be installed into an opening 14 of the vehicle 12. The opening 14 is formed between a front header 16a adjacent a windshield 18 and a rear header 16b. The roof panel 10 forms a portion of a modular roof assembly 20 and includes a variable transmitting panel or window panel 22 that varies in transmittance to adjust the light entering a passenger compartment 24 of the vehicle 12. In order to maintain control of the operation of the variable transmittance of the window panel 22, a connection interface 30 communicatively connects a first terminal 32a in connection with the vehicle 12 to a second terminal 32b in connection with the roof panel 10. In various implementations, the disclosure provides for the connection interface 30 to electrically couple an electro-optic element 40 of the roof panel 10 to the vehicle electrical system or a controller configured to control the transmittance of the window panel 22. In this way, the disclosure provides for a consistent and robust electrical interface allowing the window control module 42 to adjust the transmittance of the window panel 22 by controlling the transmittance of the electro-optic element 40.

Figure 2:
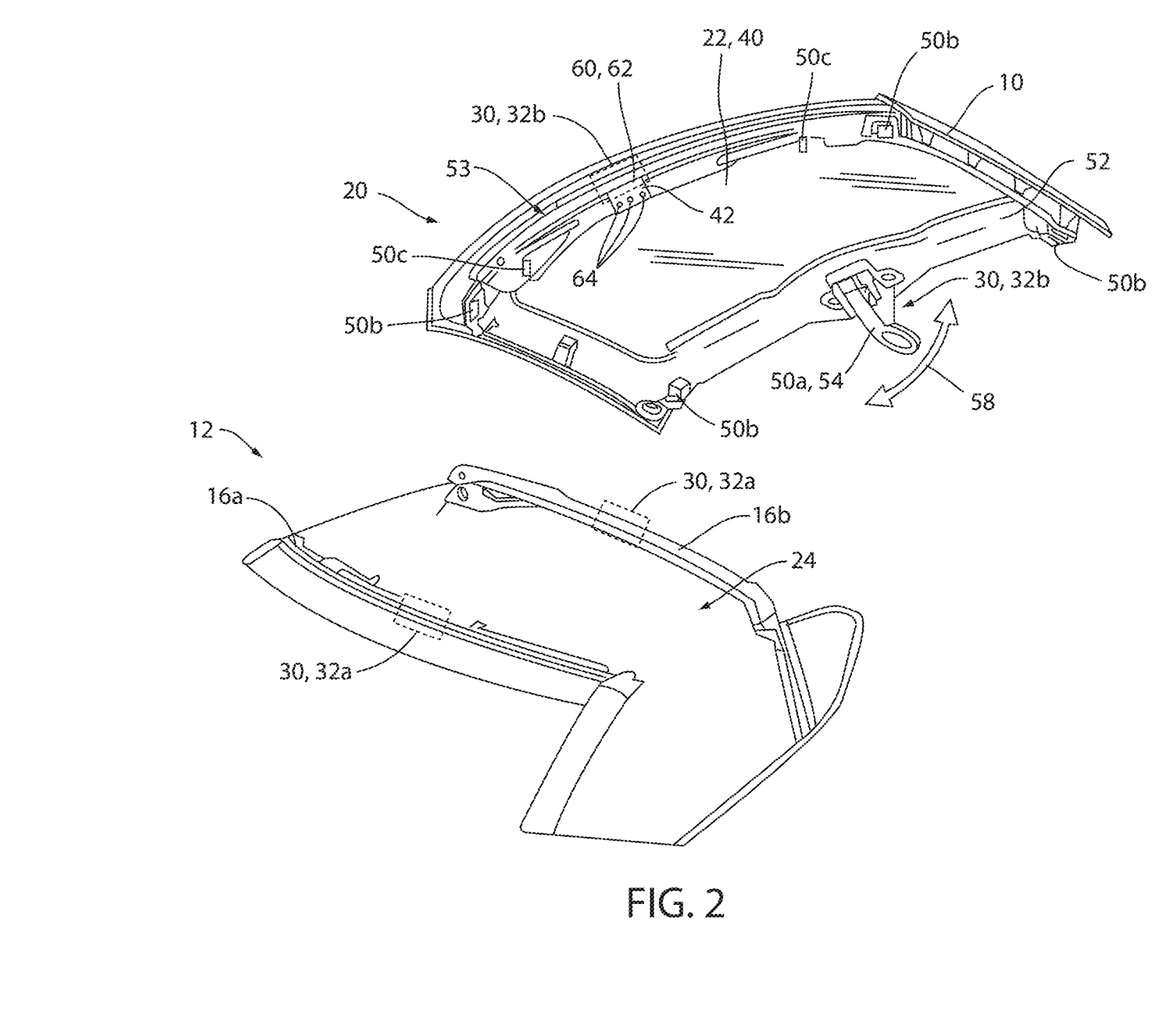
FIG. 2 is a partial exploded assembly view of the removable roof panel and an opening formed between a front and rear header of the vehicle.

As shown in FIG. 2, the roof panel 10 of the modular roof assembly 20 is located on the front header 16a and the rear header 16b via a plurality of locating features 50. The locating features may include one or more compression levers 50a, latches 50b, locating pins 50c, and various features configured to align the roof panel 10 within the opening 14 and secure the roof panel 10 to the headers 16a, 16b of the vehicle 12. The locating features may be mechanically attached to a frame 52, which may extend around a perimeter 53 of the roof panel 10. As shown, the locating features 50 are mounted to the frame 52 in complementary locations corresponding to the positions of the roof panel 10 aligned within the opening 14 formed by the headers 16a, 16b. In this configuration, the window panel 22 comprising the electro-optic element 40 is structurally supported by the frame 52 and mounted to the body of the vehicle 12.

In the illustrated example, the compression lever 50a comprises a lever arm 54 configured to compressively latch the roof panel 10 to the rear header 16b and includes a plurality of the interlocking latches 50b positioned in corner portions of the roof panel 10 aligned with corresponding interlocking latches 50b connected to the front header 16a. The mating components of the latches 50b may include complementary features (e.g. draw bars, hooks, etc.) for mechanical connection. Additionally, or alternatively, one or more of the locating pins 50c may serve to align the roof panel 10, such that the compression lever 50a and latches 50b are positioned to secure the roof panel 10 to the vehicle in response to a rotation 58 of the lever arm 54. Accordingly, the roof assembly 20 may easily be connected and disconnected from the vehicle 12.

Various components or assemblies of the connection interface 30 may be incorporated in or advantageously utilize the mating interaction or positioning of the locating features 50 to align and/or connect the terminals 32a and 32b of the connection interface 30. For example, in some implementations, the connection interface 30 may be incorporated in a portion of one or more of the locating features 50 and provide an electrical coupling between the window control module 42 and the vehicle electrical system or supply based on an alignment or connection attributed to the locking of the locating feature 50. In this way, the connection interface 30 may provide for an electrical coupling between the window control module 42 incorporated in the roof panel 10 and the vehicle electrical system disposed in the vehicle 12 via the structural connection between the roof panel 10 and the vehicle 12 without requiring additional connections and minimizing steps for installation.

In various implementations, the window control module 42 may be incorporated in the roof panel 10 or may be incorporated in the vehicle 12 (e.g., in a center console, center stack, panel console, etc.). As depicted in FIG. 2, in cases where the window control module 42 is incorporated in the roof panel 10, a user interface 60 may further be included in the roof panel 10. For example, an interface panel 62 comprising a plurality of user inputs 64 may be incorporated or installed in an opening formed in the frame 52 of the roof panel 10. The user inputs may include controls configured to communicate instructions to the window control module 42 to activate and/or control the transmittance of the electro-optic element 40 of the window panel 22. Accordingly, the disclosure provides for the connection interface to communicate power to supply the window control module 42 in some implementations and may also communicate control instructions to control drive circuitry for the electro-optic element 40.

Figure 3:
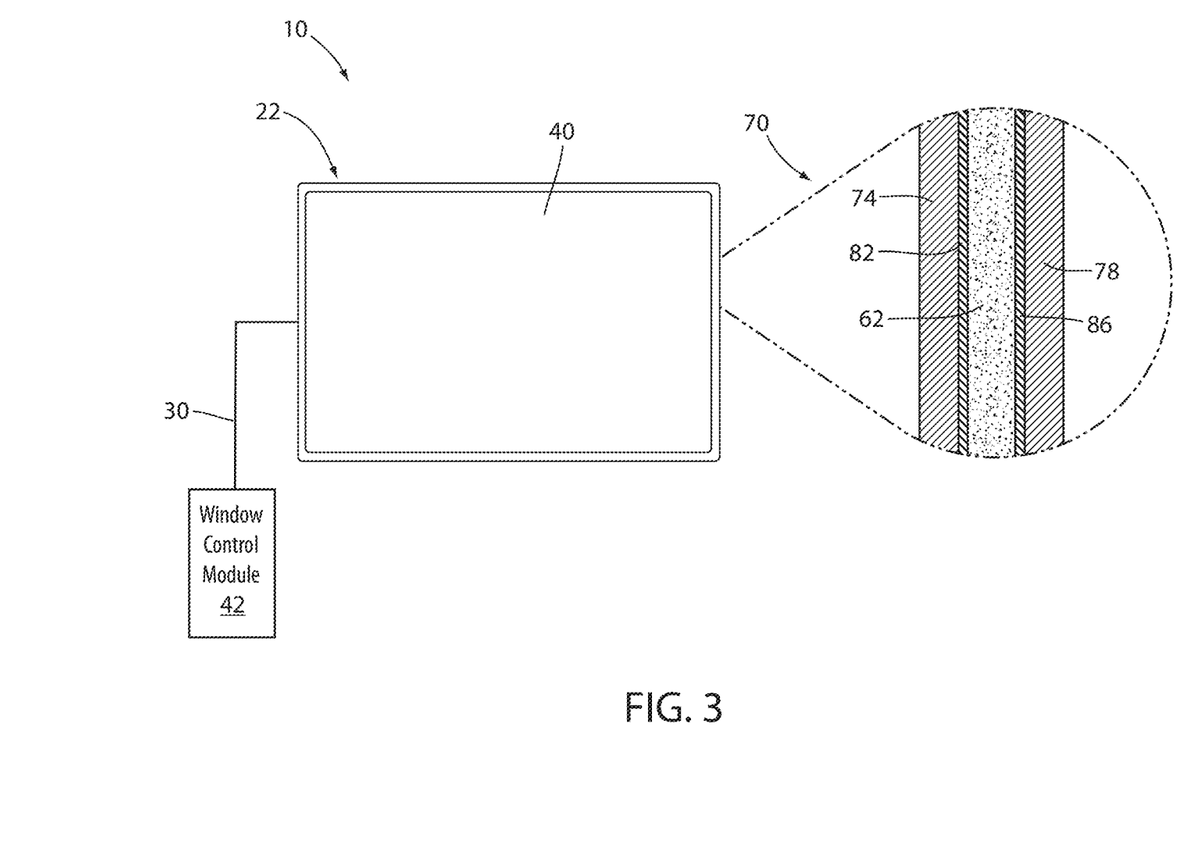
FIG. 3 is a simplified schematic diagram of an electro-optic element of a window panel.
Figure 4:
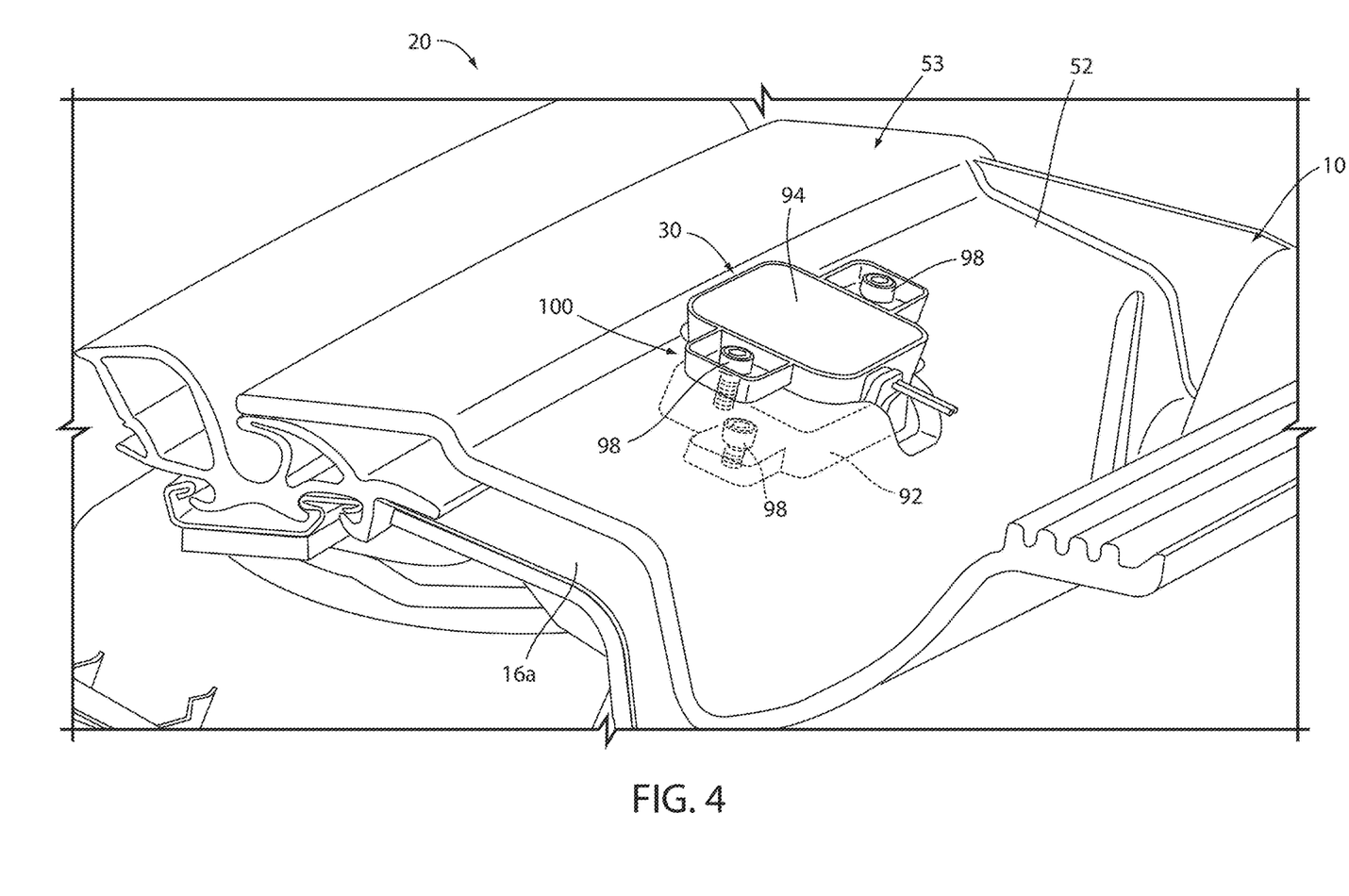
FIG. 4 is a partial assembly view of an electrical connection interface demonstrated in connection with a frame of the roof panel and a header portion of the vehicle.
Figure 5:
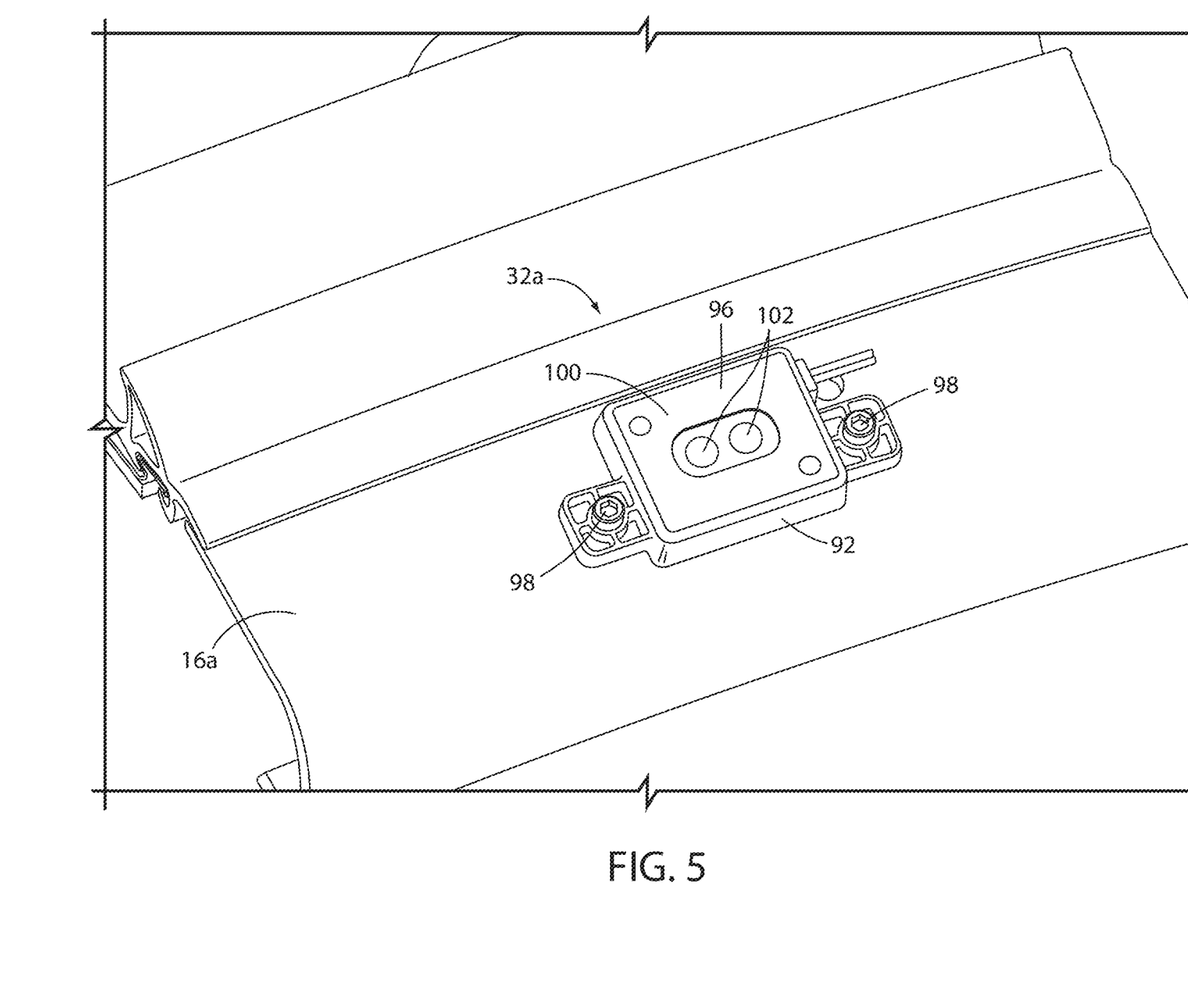
FIG. 5 is a partial assembly view of a first module of the connection interface demonstrated in connection with a header of the vehicle.
Figure 6:
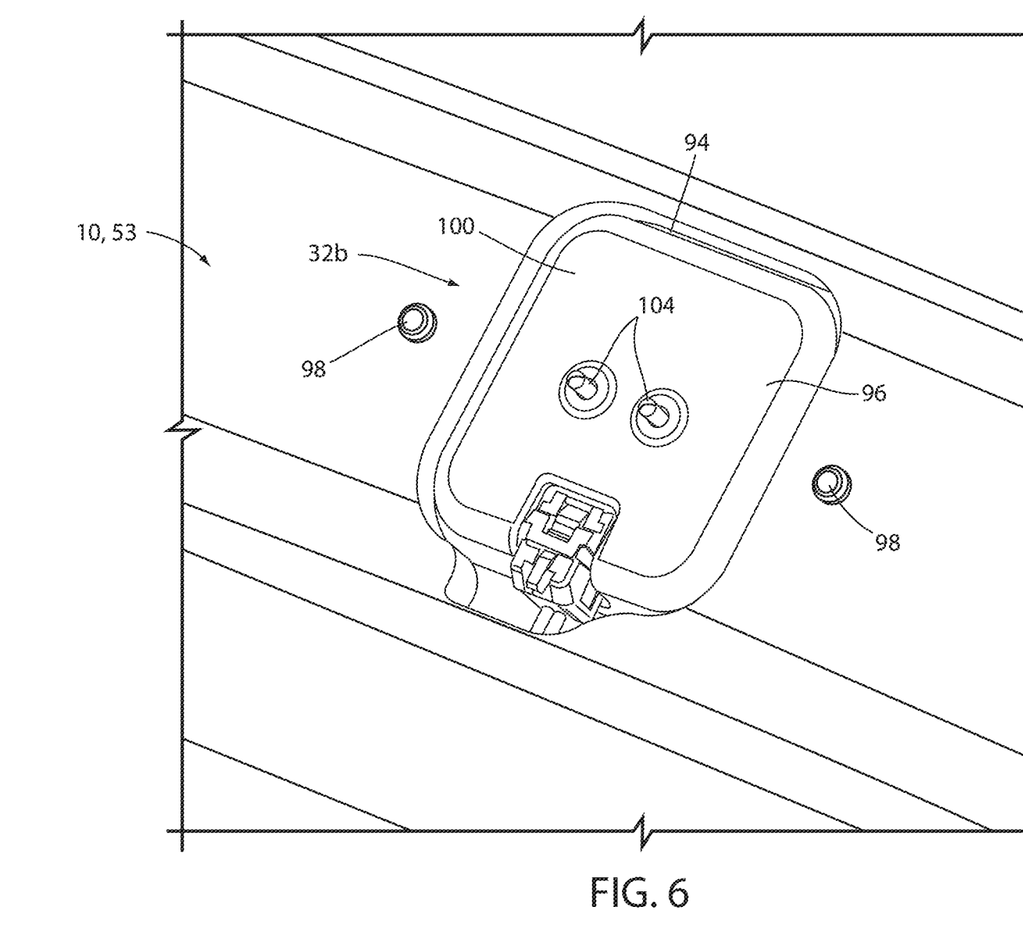
FIG. 6 is a second module of the connection interface demonstrated in connection with the frame of the roof panel.
Figure 7:
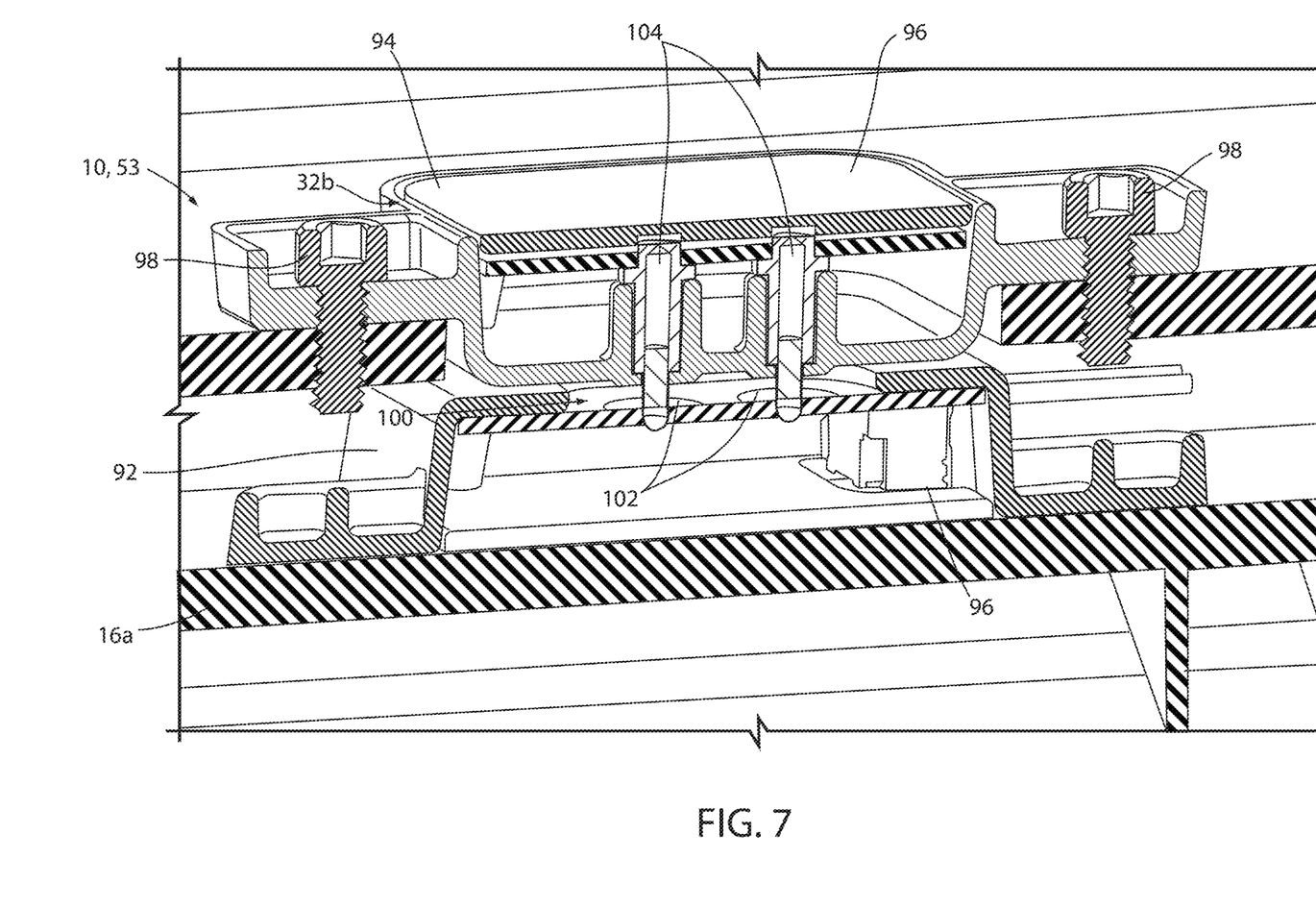
FIG. 7 is a cross-body sectional view of the first and second modules of the connection interface demonstrating an electrical connection.
Figure 8:
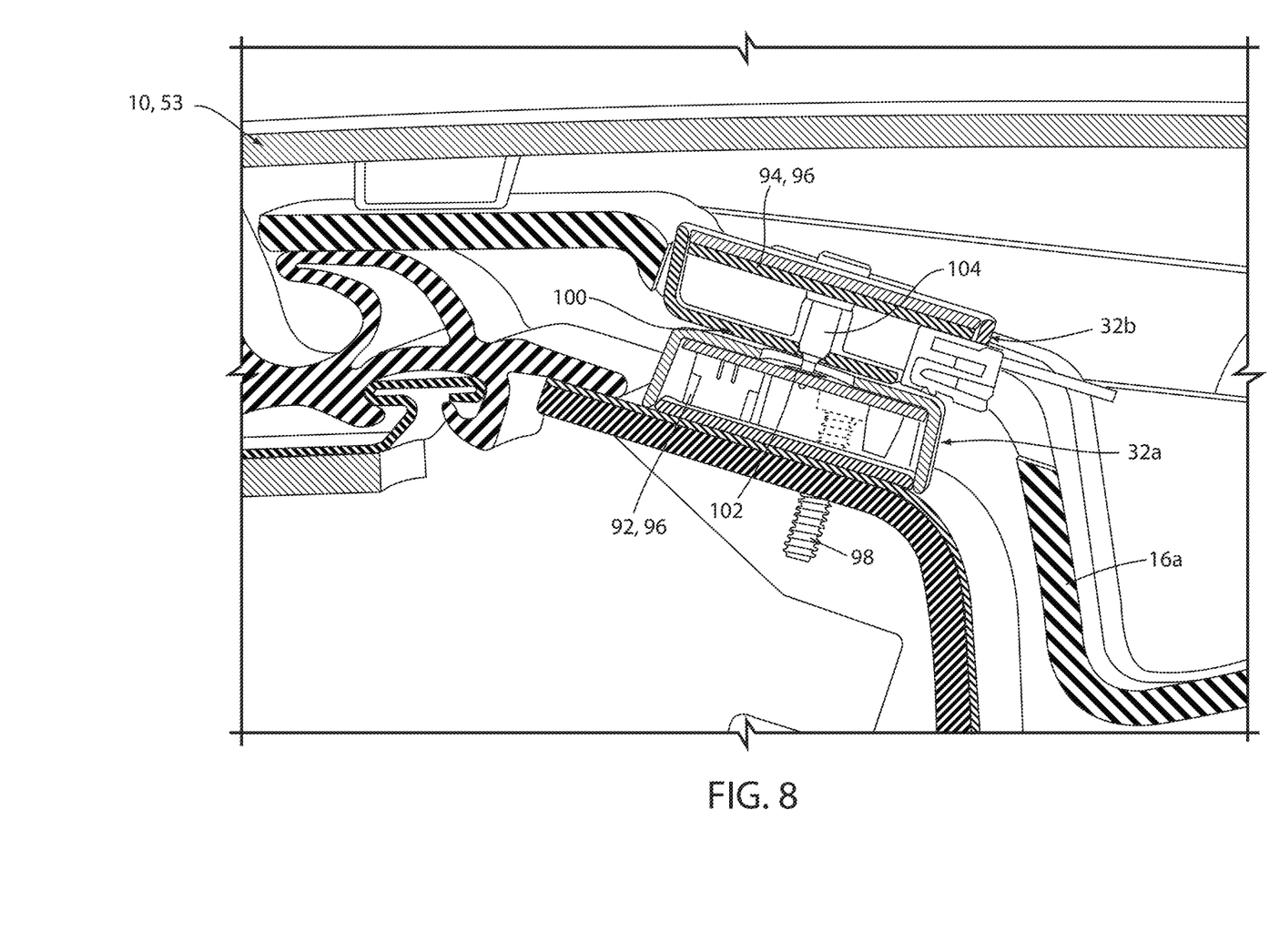
FIG. 8 is a fore-aft sectional view of the first and second modules of the connection interface.

Referring to FIG. 3, a simplified, schematic diagram of the electro-optic element 40 of the window panel 22 is shown. In order to provide for control of the electro-optic element 40 from within the vehicle 12, the connection interface 30 communicatively connects the vehicle electrical system to the window control module 42. In this configuration, the window control module 42 may be operable to control a voltage, or electrical signal, supplied to each of the electro-optic element 40 or multiple electro-optic elements, which may form dimming zones of the window panel 22. By controlling signals or voltages supplied to the connection interface 30, the window control module 42 may control a variable transmittance through an electro-optic medium 62 of the electro-optic element 40.

As demonstrated in FIG. 3, a detailed cross-section 70 of the window panel 22 is shown demonstrating a stacked structure of an exemplary configuration. The window panel 22 may include a first substrate 74 oriented to a second substrate 78 in a spaced-apart configuration. The electro-optic medium 62 (e.g., electrochromic material) may be enclosed between the first substrate 74 and the second substrate 78. A first transparent electrode 82 may be disposed between the first substrate 74 and the electro-optic medium 62, and a second transparent electrode 86 may be disposed between the second substrate 78 and the electro-optic medium 62.

The electro-optic element 40 and the first and second substrates 74, 78 may be formed of various materials. For example, the first and second substrates 74, 78 may include plastic materials. Plastic materials for the first and second substrates 74, 78 may include, but are not limited to, a clear polycarbonate, polyethylene terephthalate (PET), polyamide, acrylic, cyclic olefin, polyethylene (PEN), metallocene polyethylene (mPE), silicone, urethane, and various polymeric materials. The first and second substrates 74, 78 may also be of various forms of glass, including, but not limited to, soda lime float glass, borosilicate glass, boro-aluminosilicate glass, or various other compositions. When using glass substrates, the first and second substrates 74, 78 can be annealed, heat strengthened, chemically strengthened, partially tempered, or fully tempered. The electro-optic element 40 forming the window panel 22 may be supported by the frame, which may correspond to a partial or full frame that may be used to support the window panel 22 as desired.

The first and second substrates 74, 78, as well as one or more protective layers, may be adhered together by one or more cross-linked materials. For example, the cross-linked material may correspond to at least one of the following materials: polyvinyl butyral (PVB), ethylene-vinyl acetate (EVA), thermoset EVA ethylene-vinyl acetate (EVA), and thermoplastic polyurethane (TPU). The specific materials are described in the disclosure and may correspond to exemplary materials that may be employed as heavily cross-linked materials to adhere to one or more of the first and second substrates 74, 78 and/or additional protective layers or coating. Accordingly, the specific examples described herein are to be considered non-limiting examples.

According to various aspects, the electro-optic element 40 may include memory chemistry configured to retain a state of transmittance when the vehicle 12 and the window control module 42 are inactive (e.g., not actively supplied energy from a power supply of the vehicle 12). That is, the electro-optic element 40 may be implemented as an electrochromic device having a persistent color memory configured to provide a current during clearing for a substantial time period after being charged. An example of such a device is discussed in U.S. Pat. No. 9,964,828 entitled "ELECTROCHEMICAL ENERGY STORAGE DEVICES," the disclosure of which is incorporated herein by reference in its entirety.

The electro-optic element 40 may correspond to an electrochromic device being configured to vary the transmittance of the window panel 22 discussed herein in response to an applied voltage from the window control module 42. Examples of control circuits and related devices that may be configured to provide for electrodes and hardware configured to control the electro-optic element 40 are generally described in commonly assigned U.S. Pat. No. 8,547,624 entitled "VARIABLE TRANSMISSION WINDOW SYSTEM," U.S. Pat. No. 6,407,847 entitled "ELECTROCHROMIC MEDIUM HAVING A COLOR STABILITY," U.S. Pat. No. 6,239,898 entitled "ELECTROCHROMIC STRUCTURES," U.S. Pat. No. 6,597,489 entitled "ELECTRODE DESIGN FOR ELECTROCHROMIC DEVICES," and U.S. Pat. No. 5,805,330 entitled "ELECTRO-OPTIC WINDOW INCORPORATING A DISCRETE PHOTOVOLTAIC DEVICE," the entire disclosures of each of which are incorporated herein by reference. Examples of electrochromic devices that may be used in windows are described in U.S. Pat. No. 6,433,914 entitled "COLOR-STABILIZED ELECTROCHROMIC DEVICES," U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 5,940,201 entitled "ELECTROCHROMIC MIRROR WITH TWO THIN GLASS ELEMENTS AND A GELLED ELECTROCHROMIC MEDIUM," and U.S. Pat. No. 7,372,611 entitled "VEHICULAR REARVIEW MIRROR ELEMENTS AND ASSEMBLIES INCORPORATING THESE ELEMENTS," the entire disclosures of each of which are incorporated herein by reference. Other examples of variable transmission windows and systems for controlling them are disclosed in commonly assigned U.S. Pat. No. 7,085,609, entitled "VARIABLE TRANSMISSION WINDOW CONSTRUCTIONS," and U.S. Pat. No. 6,567,708 entitled "SYSTEM TO INTERCONNECT, LINK, AND CONTROL VARIABLE TRANSMISSION WINDOWS AND VARIABLE TRANSMISSION WINDOW CONSTRUCTIONS," each of which is incorporated herein by reference in its entirety. In other embodiments, the electro-optic device may include a suspended particle device, liquid crystal, or other system that changes transmittance with the application of an electrical property.

Referring to FIGS. 4-12, various components and assemblies are shown demonstrating examples of the connection interface 30 in accordance with the disclosure. As demonstrated in FIGS. 4-8, a first implementation of the connection interface 30 comprises a first connection module 92 and a second connection module 94. The first connection module is connected to an outward facing surface of one of the front or rear headers 16a, 16b and may be aligned with the second module 94 in connection with a corresponding portion of the frame 52 of the roof panel 10. Each of the connection modules 92, 94 are demonstrated disposed in enclosed housings 96, which are connected to the corresponding portions of the header 16a or 16b and the frame 52 via mechanical fasteners 98. In this configuration, the connection modules 92, 94 are permanently affixed to the header 16a or 16b or the vehicle 12 and a perimeter portion 53 of the frame 52 of the roof panel 10. In this configuration, an interface surface 100 of each of the connection modules 92, 94 may be aligned based on the mating position and orientation of the roof panel 10 in connection with the headers 16a, 16b of the vehicle 12.

The first connection module 92 may comprise a plurality of conductive pads 102 disposed on the interface surface 100. Opposing and facing the conductive pads 102 of the first connection module 92, the second connection module 94 may comprise a plurality of spring pins 104 or compressible conductors protruding from the opposing interface surface 100. In this configuration, the mating of the roof panel 10 of the opening 14 formed between the front header 16a and the rear header 16b of the vehicle 12 may align each of the spring pins 104 with the fixed positions of the conductive pads 102, such that the spring pins 104 compressively engage the conductive pads 102 as a result of the connection of the roof panel 10 to the vehicle 12. In this way, the connection modules 92, 94 may provide for an electrical coupling of the connection interface 30 providing a conductive path for power to pass between the vehicle electrical system and the window control module 42.

Figure 9:
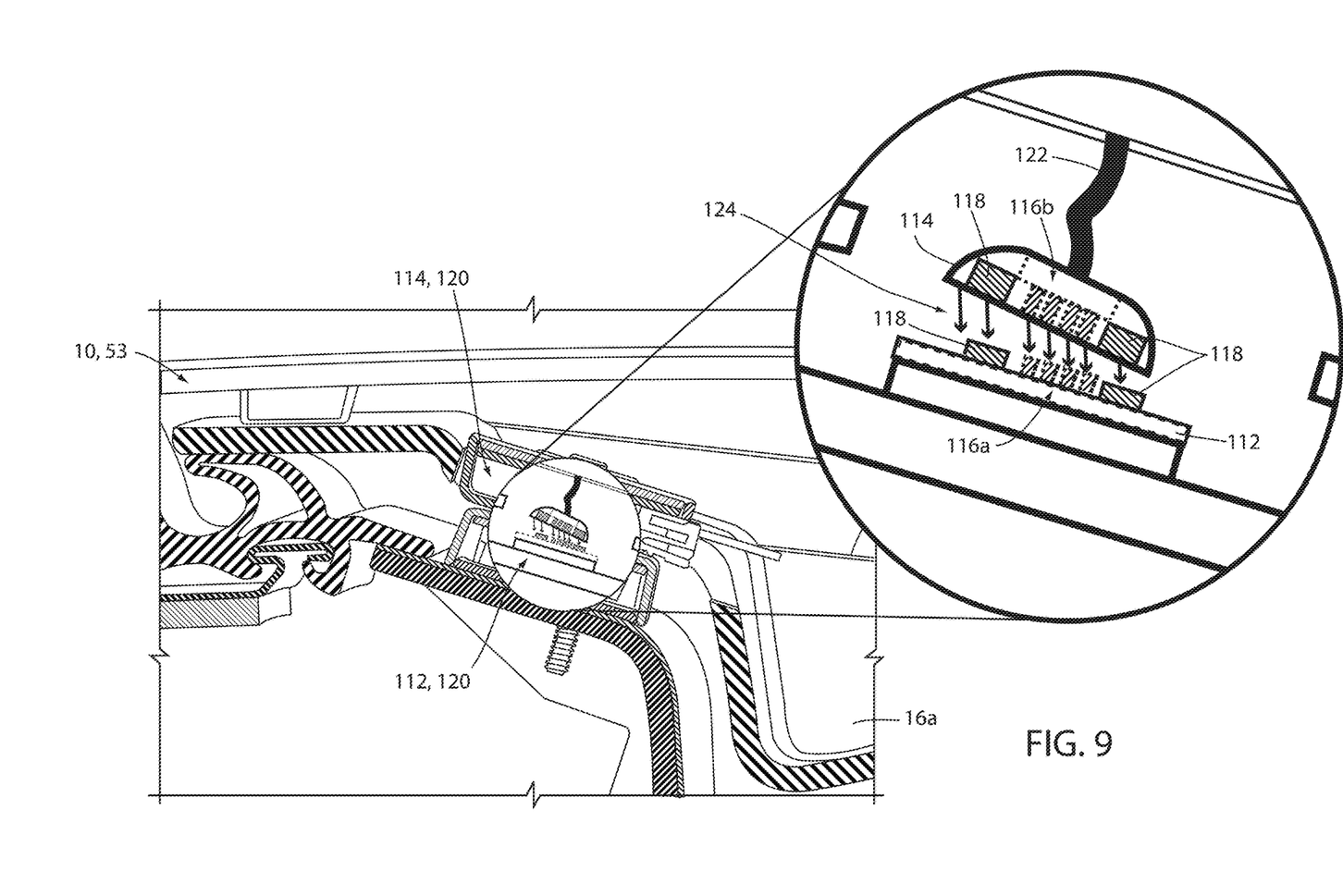
FIG. 9 is a fore-aft cross-sectional view of a magnetically aligned variation of the connection interface.

Referring now to FIG. 9, a magnetically aligned variation of the connection interface 30 is shown demonstrating a first connection module 112 configured to magnetically align and engage a second connection module 114. Similar to the connection modules 92, 94, each of the first connection module 112 and the second connection module 114 are affixed to the header 16a or 16b of the vehicle 12 and the frame 52 of the roof panel 10, respectively. In order to achieve a flexible alignment between a first set of terminals 116a of the first connection module 112 and a second set of terminals 116b of the second connection module 114, each of the connection modules 112, 114 include a plurality of alignment magnets arranged such that the mating terminals 116a and 116b of each of the connection modules 112, 114 are aligned and conductively engaged based on the magnetic attraction of the corresponding alignment magnets 118.

Further, one of the first or second connection modules 112, 114 may be flexibly connected to a housing 120.

As depicted, the second connection module 114 is flexibly connected to the housing 120 via a flexible harness 122 in which the conductive connections of the connection interface 30 are insulated and enclosed. In this configuration, the flexible harness 122 may allow the second connection module 114 to move as a result of the magnetic attraction of the alignment magnets 118. As a result, the connection modules 112 and 114 will magnetically engage each other along an interface surface 124 and align each of the corresponding sets of terminals 116a and 116b to achieve the connection interface 30. As discussed in reference to the second connection module 114, the flexible harness 122 may similarly be adapted for connection between the first connection module 112 and the corresponding housing 120 for both of the connection modules 112 and 114 may similarly be flexibly connected to their respective housings 120. In this configuration, the connection interface 30 may limit mechanical stress placed on the interface surface 124 and the corresponding terminals 116a, 116b by limiting the contact force between the connection modules 112 and 114 to the attractive force of the alignment magnets 118 rather than a compressive force associated with the roof panel 10 to the vehicle 12. Accordingly, the flexible harness may provide for improved longevity while maintaining consistent connection of the connection interface 30.

Referring now to FIGS. 10A, 10B, 11, and 12, an implementation of the connection interface 30 incorporated in one or more of the locating pins 50c is shown. As demonstrated in FIG. 10A, the locating pin 50c forms an elongated body 130 comprising a cylindrical protrusion 132 forming a first end portion and a threaded connection 134 forming an opposing second section. Between the cylindrical protrusion 132 and the threaded connection 134, an assembly interface 136 (e.g., a hexagonal engagement profile) and an assembly damper 138 are disposed. In the assembled configuration demonstrated in FIG. 10A, the cylindrical protrusion 132 of the locating pin 50c extends into a receiving aperture 144 formed within a portion of one of the headers 16a, 16b. In this arrangement, the insertion of the locating pin 50c aligns the roof panel 10 with the opening 14 formed between the headers 16a, 16b of the vehicle 12 to align the roof panel 10 with the vehicle 12 for connection.

Figure 10A:
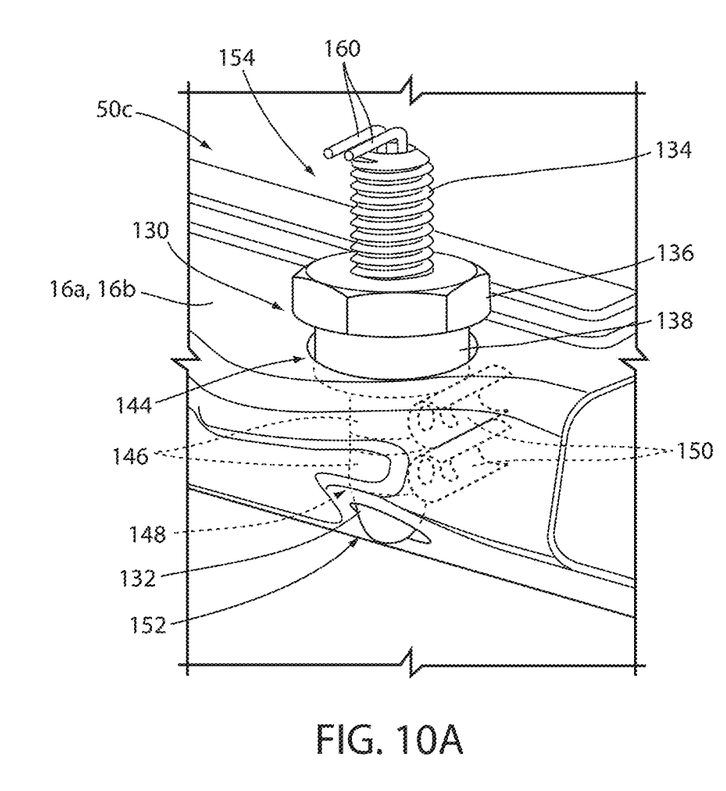
FIGS. 10A and 10B demonstrate partial assembly views of an implementation of the connection interface incorporated in a locating pin.
Figure 10B:
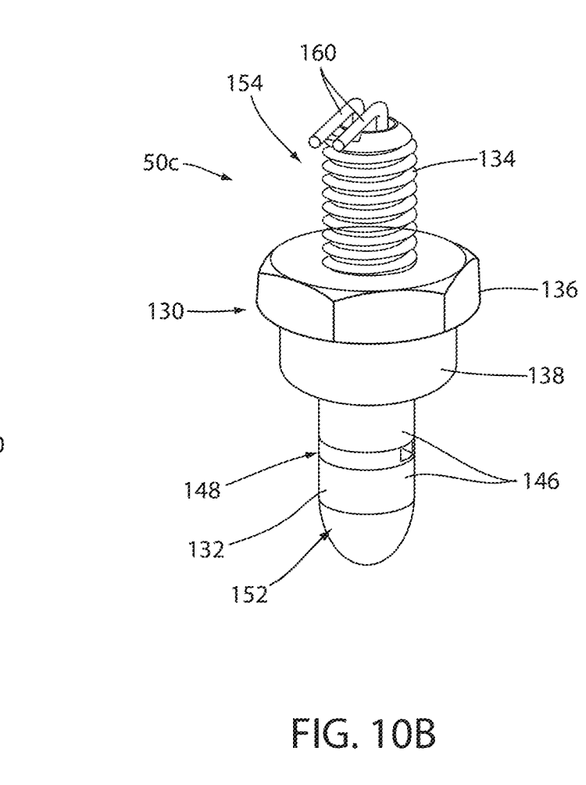

In addition to the mechanical alignment with the vehicle 12, the locating pin 50c comprises either a single conductive pad or a plurality of conductive pads 146 extending radially about an exterior surface 148 of the cylindrical protrusion 132. The conductive pads 146 may closely follow the profile of the exterior surface 148, such that they are significantly aligned with the exterior surface 148. In some implementations, recessed troughs may be formed over portions of the exterior surface 148, such that the conductive pads 146 may be received and align with or be positioned somewhat inset from the exterior surface 148 of the protrusion 132. In the assembled configuration, the conductive pads 146 may align with corresponding contacts 150, which may protrude from a wall of the receiving aperture 144 within the header 16a or 16b, such that the contacts 150 compressively engage the conductive pads as a result of the cylindrical protrusion 132 aligned within the receiving aperture 144. The contacts 150 may correspond to spring contacts or contacts that elastically deform such that the conductive connection is maintained for the connection interface 30.

Figure 11:
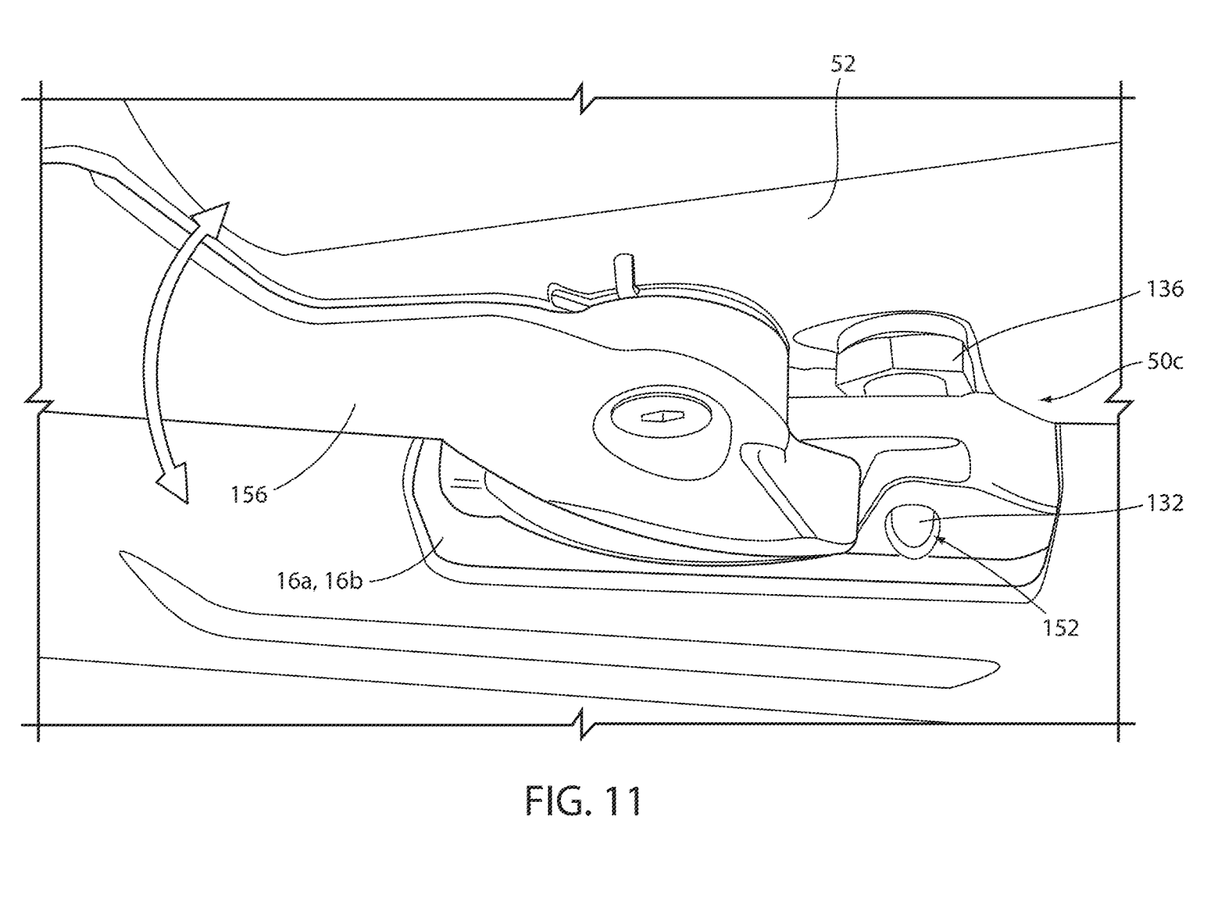
FIG. 11 is a projected view of a rotating latch assembly incorporated on a header of the vehicle demonstrating a connection with the locating pin comprising the connection interface.

As depicted in FIG. 11, the cylindrical protrusion 132 is shown having a distal end 152 extending through the receiving aperture 144 of the header 16a or 16b. A proximal end 154 is connected to a portion of the frame 52 of the roof panel 10 via the threaded connection 134. In order to secure the roof panel 10 and affix the alignment of the cylindrical protrusion 132 within the receiving aperture 144, the roof assembly 20 may comprise a rotating latch 156 that compressively engages the roof panel 10 in connection with the header 16a or 16b of the vehicle 12.

Figure 12:
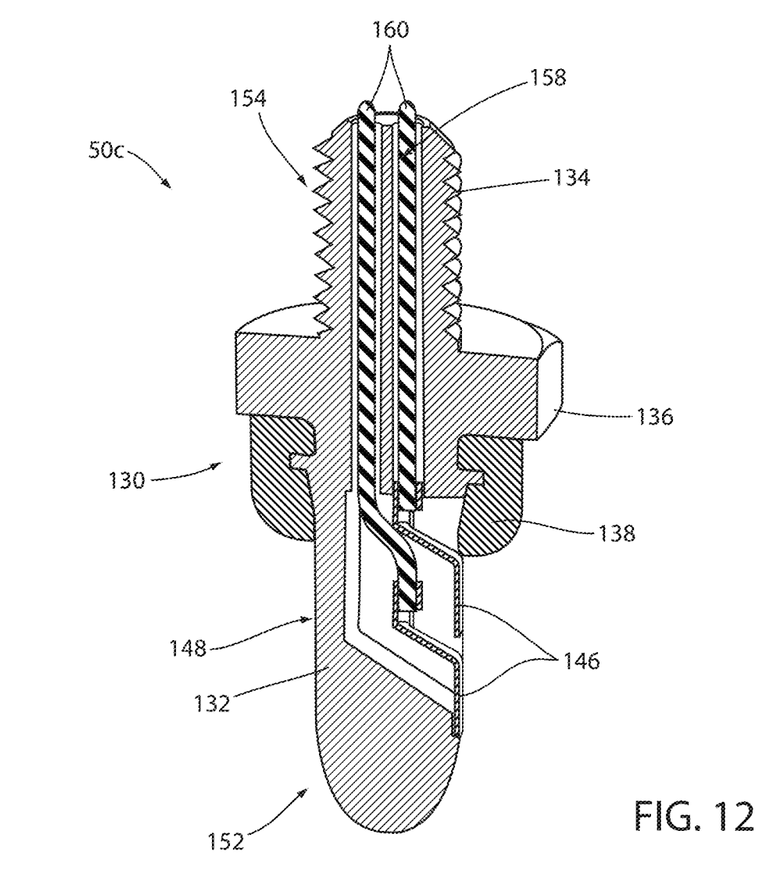
FIG. 12 is a cross-sectional view of the locating pin demonstrating conductive pads disposed about an exterior surface of an engaging protrusion of the locating pin in accordance with the disclosure.

As demonstrated in FIG. 12, a cross section of the locating pin 50c demonstrates an interior passage 158 formed through the elongated body 130 extending from the proximal end 154 and near the distal end 152. The interior passage 158 provides a concealed and mechanically isolated path for a plurality of conductive connectors 160 to extend from the proximal end 154 in connection with the roof panel 10 to the conductive pads 146. In this configuration, the conductive contact between the conductive pads 146 of the locating pin 50c with the contacts 150 disposed in the receiving aperture 144 of the header 16a or 16b provides for electrical communication between the electro-optic element 40 of the window panel 22 and the window control module 42 disposed within the vehicle 12. Accordingly, the combination of the connection interface 30 with the locating pin 50c provides for electrical communication and/or power distribution between the window control module 42 and the electro-optic element 40 or the vehicle electrical system via the existing locating feature 50 of the roof panel 10.

According to some aspects of the disclosure, a window apparatus of a vehicle comprises a removable panel that selectively encloses an exterior opening of the vehicle. A window comprising an electro-optic element in connection with the removable panel, wherein the electro-optic element comprises at least one electrical terminal. A connection interface configured to selectively connect the removable panel to the vehicle, wherein the connection interface comprises a first connection module configured for connection to the header of the vehicle; and a second connection module in connection with an interface surface of the removable panel, wherein an alignment of the first and second connection modules electrically connects an electrical supply of the vehicle to the at least one terminal based on an alignment between the connection modules in an assembled configuration of the window panel in connection with the vehicle.

According to various aspects, the disclosure may implement one or more of the following features or configurations in various combinations:

the electro-optic element is configured to adjust a transmittance of the window with power supplied via the first connection module and the second connection module;

the first connection module and the second connection module form an electrical harness that is conductively connected in response to the connection of the removable panel with the vehicle in the assembled configuration;

the interface surface is aligned with a header proximate to the exterior opening of the vehicle in the assembled configuration;

the interface surface and the header form a panel cavity between the window panel and the body of the vehicle in the assembled configuration;

the connection interface is disposed in the panel cavity in the assembled configuration;

the first connection module and the second connection module comprise a plurality of complementary conductive contacts that conductive connect the electrical supply of the vehicle to the at least on electrical terminal;

at least one of the first connection module and the second connection module comprise a magnetic element;

the complementary conductive contacts are aligned by an attraction between the first connection module and the second connection module by the magnetic element;

the second connection module is flexibly connected to the removable panel by a flexible conductive connector;

the connection interface comprises a latch configured to lock the removable panel in connection with the vehicle;

the connection interface comprises at least one locating pin forming a protrusion extending from the connection interface, wherein the locating pin comprises one or more conductive pads extending about an exterior surface of the protrusion;

the protrusion of the locating pin is received by a receiving aperture formed in connection with the in the body portion, and the plurality of conductive pads conductively engage a plurality of conductive contacts disposed in the receiving aperture;

the plurality of conductive pads align with the conductive spring contacts along a length of the locating pin in response to the engagement of the protrusion within the receiving aperture; and/or the alignment between the conductive spring contacts and the conductive pads is secured via the connection interface.

According to another aspect of the invention, a window apparatus of a vehicle comprises a removable panel comprising an electro-optic window element comprising at least one conductive terminal, wherein the removable panel selectively encloses an exterior opening of the vehicle and a window, and a connection interface configured to selectively connect the removable panel to the vehicle, wherein the connection interface comprises a mating pair of connection modules extending from the header of the vehicle an interface surface of the removable panel, wherein the connection interface is disposed in a cavity between the header and the interface surface, wherein the connection modules of the connection interface are aligned and electrically connected in response to an assembled configuration of the window panel in connection with the vehicle.

According to various aspects, the disclosure may implement one or more of the following features or configurations in various combinations:

the connection interface comprises at least one locating pin forming a protrusion extending from the connection interface, wherein the locating pin comprises one or more conductive pads extending about an exterior surface of the protrusion;

the protrusion of the locating pin is received by a receiving aperture formed in connection with the in the body portion, and the plurality of conductive pads conductively engage a plurality of conductive contacts disposed in the receiving aperture; and/or the connection modules comprise plurality of spring pins that extend through the cavity between the header and the interface surface in the assembled configuration conductively connecting an electrical supply of the vehicle to the at least one terminal of the electro-optic element.

According to another aspect of the invention, a removable window apparatus that selectively encloses an exterior opening of a vehicle, the removable window apparatus comprises an electro-optic element comprising at least one electrical terminal, wherein the electro-optic element controls a transmittance of the window apparatus and a connection interface that selectively locks the removable window panel to the vehicle in an assembled configuration. The connection interface comprises at least one locating pin forming a protrusion extending from the connection interface, the locating pin having one or more conductive pads extending along an exterior surface of the protrusion, and a receiving aperture forming an interior wall, wherein a plurality of conductive contacts disposed on the interior wall, wherein the plurality of conductive pads conductively engage the conductive contacts in the assembled configuration.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A window apparatus of a vehicle comprising:
   a removable panel that selectively encloses an exterior opening of the vehicle, the removable panel comprising a window including an electro-optic element configured to adjust a transmittance through at least a portion of the window, wherein the electro-optic element comprises at least one electrical terminal; and
   a connection interface configured to selectively connect the removable panel to the vehicle, wherein the connection interface comprises:
      a first connection module configured for connection to the header of the vehicle; and
      a second connection module in connection with an interface surface of the removable panel; and
   wherein an alignment of the first and second connection modules electrically connects an electrical supply of the vehicle to the at least one terminal based on an alignment between the connection modules in an assembled configuration of the window panel in connection with the vehicle, and wherein the alignment of the first and second connection modules comprises the compression of a spring-biased conductor or spring pin extending from one of the first and the second connection modules between the vehicle and the removable panel.

2. The window apparatus according to claim 1, wherein the electro-optic element is configured to adjust a transmittance of the window with power supplied via the first connection module and the second connection module.

3. The window apparatus according to claim 1, wherein the first connection module and the second connection module form an electrical harness that is conductively connected in response to the connection of the removable panel with the vehicle in the assembled configuration.

4. The window apparatus according to claim 1, wherein the interface surface is aligned with a header proximate to the exterior opening of the vehicle in the assembled configuration.

5. The window apparatus according to claim 1, wherein the interface surface and the header form a panel cavity between the window panel and the body of the vehicle in the assembled configuration.

6. The window apparatus according to claim 5, wherein the connection interface is disposed in the panel cavity in the assembled configuration.

7. The window apparatus according to claim 1, wherein the first connection module and the second connection module comprise a plurality of complementary conductive contacts that conductively connect the electrical supply of the vehicle to the at least on electrical terminal.

8. The window apparatus according to claim 1, wherein the connection interface comprises a latch configured to lock the removable panel in connection with the vehicle.

9. A window apparatus of a vehicle comprising:
- a removable panel comprising an electro-optic window element comprising at least one conductive terminal, wherein the removable panel selectively encloses an exterior opening of the vehicle and a window; and
- a connection interface configured to selectively connect the removable panel to the vehicle, wherein the connection interface comprises a mating pair of connection modules extending from the header of the vehicle to an interface surface of the removable panel, wherein the connection interface is disposed in a cavity between the header and the interface surface, wherein the connection modules of the connection interface are aligned and electrically connected in response to an assembled configuration of the window panel in connection with the vehicle, wherein the connection modules comprise a plurality of spring pins that extend through the cavity between the header and the interface surface in the assembled configuration conductively connecting an electrical supply of the vehicle to the at least one terminal of the electro-optic element.

10. A removable window apparatus that selectively encloses an exterior opening of a vehicle, the removable window apparatus comprising:
- an electro-optic element comprising at least one electrical terminal, wherein the electro-optic element controls a transmittance of a window of the removable window apparatus; and
- a connection interface that selectively locks the removable window apparatus to the vehicle in an assembled configuration, the connection interface comprising:
  - at least one spring-biased conductor extending from the connection interface; and
  - at least one conductive pad aligned with the spring-biased conductor in the assembled configuration,
  - wherein the spring-biased conductor and the conductive pad are positioned between at least a portion of the removeable window apparatus and a portion of the vehicle and an engagement between the spring-biased conductor and the conductive pad causes the spring-biased conductor to at least partially compress, resulting in a spring force maintaining a conductive connection between the spring-biased conductor and the conductive pad.

11. The removable window apparatus according to claim 10, wherein the spring-biased conductor or the conductive pad are in connection with an interface surface of the removable panel.

12. The removable window apparatus according to claim 11, wherein the interface surface is aligned with a header proximate to the exterior opening of the vehicle in the assembled configuration.

13. The removable window apparatus according to claim 12, wherein the interface surface and the header form a panel cavity between the removable window panel and the body of the vehicle in the assembled configuration.

14. The removable window apparatus according to claim 10, wherein the connection interface comprises a latch configured to lock the removable panel in connection with the vehicle.

15. The removable window apparatus according to claim 10, wherein the latch comprises a lever arm that rotates to compressively latch the removable window apparatus in connection with the vehicle.

16. The removable window apparatus according to claim 10, wherein the connection interface further comprises at least one locating pin in connection with the a perimeter frame of the removable window apparatus.

17. The removable window apparatus according to claim 16, wherein the at least one locating pin engages a receiving aperture that aligns the removable window apparatus to a header of the vehicle proximate to the exterior opening of a vehicle.

\* \* \* \* \*